Nov. 3, 1959  H. KNÜPPEL  2,911,571
OPERATION OF GLOW DISCHARGES
Filed April 8, 1957  3 Sheets-Sheet 1

Inventor:
Helmut Knüppel
BY Thomas, Weisman + Russell
ATTORNEYS

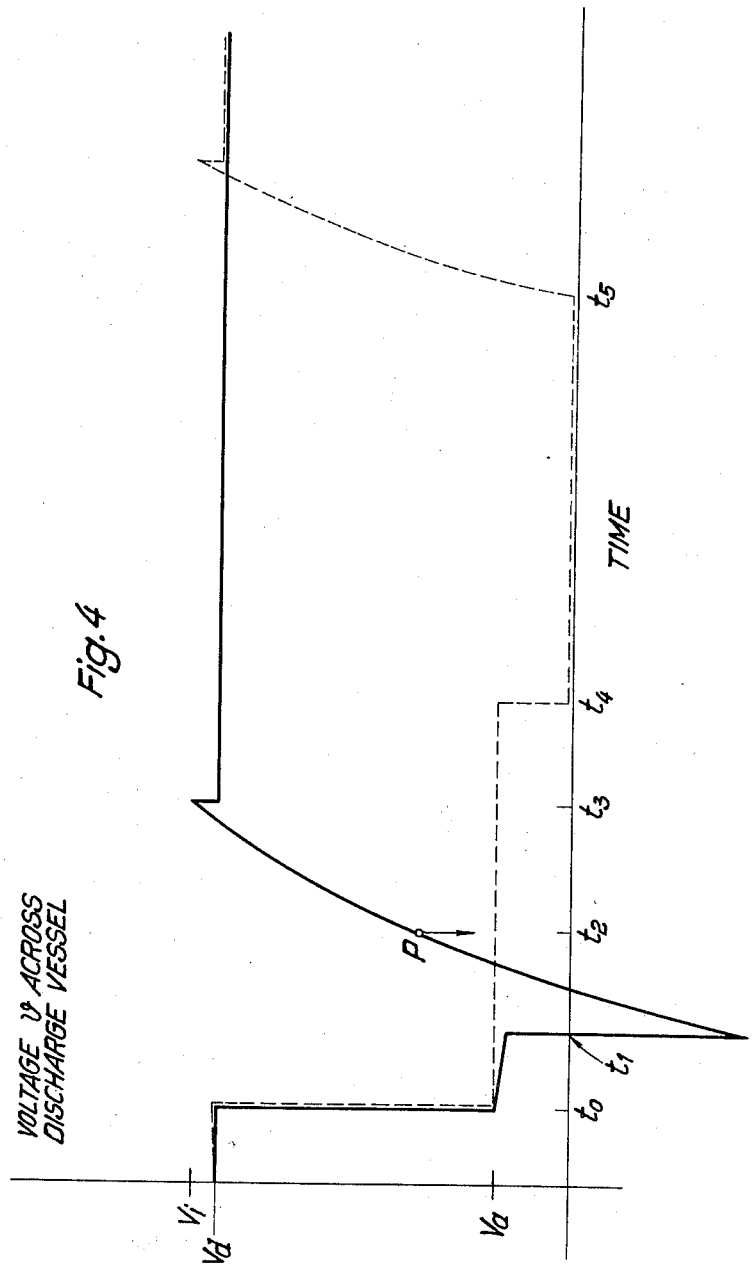

United States Patent Office 2,911,571
Patented Nov. 3, 1959

2,911,571

OPERATION OF GLOW DISCHARGES

Helmut Knüppel, Dortmund-Lottringhausen, Germany, assignor to Dortmund-Hörder Hüttenunion Aktiengesellschaft, Dortmund, Germany Application April 8, 1957, Serial No. 651,471

Claims priority, application Germany April 10, 1956

10 Claims. (Cl. 315—340)

This invention relates to improvements in apparatus for operating a glow discharge for industrial purposes.

The glow discharge is a well-known form of electric discharge between a pair of electrodes disposed in a partly evacuated tube and connected to a voltage source. For a considerable time, glow discharge tubes have been used extensively for illumination purposes, tubes for such purposes commonly being called glow lamps. Glow discharge tubes also serve as elements in electrical or electronic circuits and, in particular, as voltage regulators or stabilizers. In all such applications, the discharge current of a relatively small order of magnitude and rarely exceeds values of say 50 milliamperes.

More recently, glow discharges have also been found useful in industrial fields, the electro-chemical and thermal properties of this type of discharge playing an important role in such applications. The glow discharge may then either serve as a source of thermal energy, or it may be used for the purpose of initiating or affecting chemical reactions, or treating the surfaces of metal objects. This invention is only related to glow discharges for applications of the latter kind, as distinguished from glow lamps, stabilizers and related devices. One major difference between the two kinds of utilizing glow discharges just referred to lies in the fact that glow discharges for the said industrial purposes are usually operated at currents of an order of magnitude between 5 and several hundreds of amperes. Also, while in the first mentioned low-power devices the evacuated chamber is usually a glass tube of comparatively small dimensions, industrial applications of the glow discharge require vacuum chambers made of steel, chambers which, with regard to shape and size, are comparable to furnaces.

In utilizing a glow discharge for say the purpose of surface treatment, the object to be treated is placed into a vacuum chamber, hereafter referred to as "the vessel." The vessel includes suitable means for supporting the object, and it is equipped with at least two electrodes to which a voltage may be applied through an external circuit. Sometimes, the vessel itself may form one of the electrodes. After the object has been placed into the vessel, the latter is closed and sealed, so that thereupon it may be evacuated until the internal pressure drops to a value at which a glow discharge may be maintained between the electrodes.

For most purposes, it is necessary to treat the object in the atmosphere of a gas different from air. For example, nitrogenization may be carried out in an atmosphere of ammonia, while a gas suitable for carbonization is methane. In such cases, the vessel is connected by one pipe to a vacuum pump and by another pipe to a gas supply, the latter pipe comprising a throttle. While the vessel is being evacuated, some gas form the supply is allowed to enter the vessel across the throttle at low pressure. Continuing the process for a sufficient length of time results in the vessel finally being filled with gas, with only a negligible percentage of air remaining. After the required gas pressure has been established inside the vessel, a voltage of suitable magnitude is applied to the electrodes so that a glow discharge is ignited between the electrodes.

Ignition of the glow discharge may be achieved just by raising the voltage sufficiently above the value which is required for subsequently maintaining the discharge. Sometimes, however, the difference between the voltage value required for ignition and the lower voltage value sufficient for maintaining the discharge is undesirably large. In such cases, an auxiliary electrode may be provided, often referred to as ignition electrode.

For operating the glow discharge, either D.-C. or A.-C. may be used. It was found, however, that D.-C. is preferable to A.-C. in many respects, the reason being that the most effective region within a glow discharge is that usually referred to as cathode drop, which region will at all times lie directly adjacent to the object if D.-C. is used and the object is connected to operate as cathode.

The major elements of the external circuit usually comprise a source of electric energy and an impedance, both connected in series with each other and with the vessel. If D.-C. is used, the object is often connected directly or indirectly to the negative terminal of the source, thus becoming the cathode, which is done for the reasons explained above.

Glow discharges have the well-known tendency to break down to an arc discharge. Such a breakdown is particularly undesirable in the use of glow discharges for the purpose under discussion, because an arc discharge usually has a damaging effect upon the object under treatment or upon equipment disposed in the vessel, if the arc is sustained for any appreciable time. To operate a glow discharge does not present any major difficulties if the discharge current is comparatively low, a simple resistor connected in series with the vessel then being a sufficient means to eliminate any danger of such breakdowns occurring. This is because in the lower current range a breakdown of the glow discharge to an arc discharge is impossible if the current is prevented from increasing as far as is required for igniting an arc, the arc discharge current being greater than the flow discharge current in the said range. However, if a glow discharge is operated at a higher current this simple means fails, because in the higher current range an arc discharge may exist at a current equal to or even less than the current required to sustain the glow discharge.

The border value separating what has been referred to here as the lower and higher current ranges to a certain degree depends upon circumstantial conditions, such as the nature of the gas, the gas pressure, the voltage, the configuration of the electrodes etc. However, it is safe to say that a simple series resistor will in all probability fail to operate as a breakdown preventing means if the current exceeds the order of magnitude of one ampere.

An arc discharge inside the vessel may be tolerated if the arc is not allowed to burn for a period of time exceeding the order of magnitude of one tenth of a second, because an arc burning for such a short time only is found to do no harm to the object under treatment or other parts or equipment inside the vessel. A limitation of the period of time during which the arc discharge is present may be achieved, for example, by providing in the circuit an automatic breaker which is sensitive to the increase in current occurring when the glow discharge breaks down to an arc discharge. It is also possible to provide means by which the circuit is closed automatically after the arc has been extinguished due to the action of the breaker. The switching means in the circuit may be of the electromechanical or the electronic type. However, extinction of the arc and re-ignition of the glow discharge may also be effected without any electromechanical or electronic switching action if, for example, a circuit is used as it is described in the co-pending United States application for patent by Fritz Harders, Helmut Knüppel, and Karl Brotzmann, Serial No. 515,-426, filed June 14, 1955, now Patent 2,853,655 and co-pending United States application for patent by Fritz Harders, Helmut Knüppel, and Karl Brotzmann, Serial No. 634,232, filed January 15, 1957, now Patent No. 2,852,721 which latter application is a continuation in part of the first named application, Serial No. 515,426.

For reasons of economy it is expedient to keep the time required for extinguishing and re-igniting comparatively short so that the process is interrupted for as short a time as possible. Therefore, preference is to be given to extinguishing devices which master the occurrences in a short space of time. However, the danger is then comparatively great that the vessel is insufficiently de-ionized. It then happens that the discharge when reignited takes the form an arc discharge, so that the process of extinguishing and re-igniting repeats itself. In some cases where conditions are rather unfavorable the final extinction of the arc is not accomplished at all.

The time elapsing between the breakdown of the glow discharge into an arc and the re-ignition of the glow discharge consists of two distinct periods: the extinguishing period (elapsing between the breakdown and the instant the arc is extinguished); and the ignition period (elapsing between the instant the arc is extinguished and the instant the glow discharge is re-ignited). The de-ionization of the discharge space between the electrodes takes place during the ignition period as just defined. The longer this latter period the less great is the danger that an arc will appear immediately upon re-ignition.

It is an object of the invention to overcome the difficulties arising from the conflicting requirements mentioned above and thus to allow the operation of a glow discharge of high power without any substantial damage being caused to the object under treatment or other parts or equipment inside the vessel by a possible arc discharge occurring in operation.

It is another object of the invention to provide means for extinguishing an arc discharge and re-igniting the glow discharge within a minimum of time.

It is a further object of the invention to provide efficient means to extinguish an arc discharge and re-ignite the glow discharge even in cases where the de-ionization time of the arc discharge exceeds the ignition period.

It is a still further object of the invention to provide safety means preventing an obstinate arc discharge from doing harm even if it happens that such a discharge cannot be reverted into a glow discharge.

Other objects of the invention will become apparent from the following description of one embodiment of the invention, illustrated in the drawings, in which Fig. 1 is a cross-section of a discharge vessel suitable for surface-treating metal objects and other purposes.

Fig. 4 is a plot of the voltage across the discharge vessel vs. the time.

Figure 1:
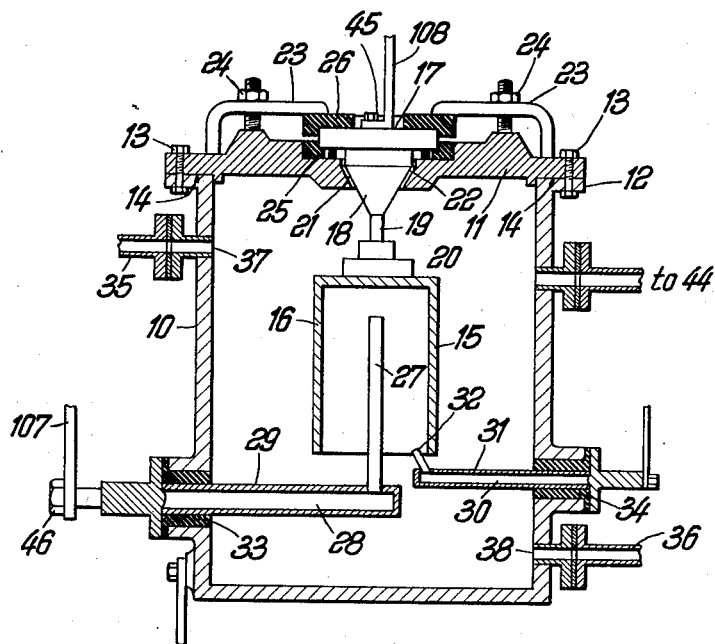
Figure 2:
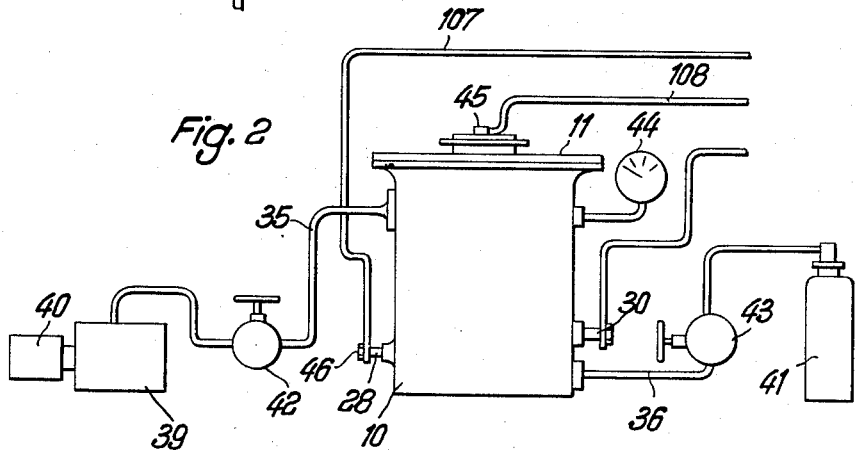
Fig. 2 is a diagram illustrating the pipe connections and electrical connections made to the vessel shown in Fig. 1.

Referring to Fig. 1, a vessel suitable for surface-treating a metal object in the presence of a glow discharge consists of a cylindrical container 10 having a lid 11 which may be fastened to a flange 12 of the container 10 by bolts 13, a gasket 14 serving to seal the interior of the container. The object shown is a hollow cylinder 15 of steel, and it is assumed that the inner surface 16 of this object is to be carbonized or nitrogenized. The cylinder 15 is supported by means of a bracket comprising a flange 17, a conical portion 18 and a rod 19 to which the cylinder 15 is fixed at 20. The conical portion 18 extends through an opening 21 of conical shape in such a way that there is a narrow gap 22 formed between the two conical surfaces. The flange 17 is held in place by several clamps 23 with bolts 24, only one clamp and bolt being shown, with a pair of gaskets 25 and 26 of insulation material serving as sealing means.

A metal rod 27 is arranged coaxially with respect to and inside the object 15, and is supported by a bracket which extends through the sidewall of the vessel and consists of a metal rod 28 covered by a layer 29 of insulation material. Another bracket of similar configuration and thus comprising a rod 30 and an insulation covering 31 carries a metal pin 32 fixed to its inner end. Sleeves 33 and 34 are provided for sealing. Two pipes, designated 35 and 36, connected to openings 37 and 38 in the side wall, are provided for evacuating the vessel and filling it with gas. The exhaust pipe 35 connects the vessel with a vacuum pump 39 driven by a motor 40. The supply pipe 36 is connected to a gas bottle 41 filled with whatever gas is to be used in the process. Each pipe is equipped with one valve, 42 and 43, valve 43 also serving as an adjustable throttle to control the pressure at which the gas enters the vessel. The pressure inside the vessel may be read from a pressure gauge 44.

Operation of the system will now be described first with no regard to the possibility of the glow discharge breaking down to an arc discharge. After the lid 11 with the object 15 fixed thereto has been fastened to the cylinder 10, pump 39 is set in operation with valve 42 being open and valve 43 adjusted to exert a certain amount of throttle action. This will cause the pressure inside the vessel to drop below atmospheric pressure, the pressure value finally reached in this way depending upon the adjustment of throttle 43. Also, while the vessel is being evacuated the amount of air contained in it will decrease gradually whereas the percentage of gas will increase. If the pump is held in operation for a sufficient length of time, the percentage of air inside the vessel will have become negligible.

In the phase of operation succeeding this evacuation the pressure inside the vessel must be held within certain limits. In some applications, the margin set by these limits is relatively wide. In such cases, operation of the pump may be discontinued and the valve 42 closed. If the pressure then approaches the upper limit of the permissible pressure range before the process is completed the pump may again be operated with the valve 42 open, to lower the pressure sufficiently.

In cases where the aforesaid margin is relatively narrow the pump may be held in operation until the process to be described now is completed.

Let a D.-C. voltage be connected to suitable terminals 45 and 46 on flange 17 and rod 28 respectively in such a way that the object 15, being conductively connected to flange 17, assumes a negative potential relative to rod 27, the latter being conductively connected to rod 28. If the voltage magnitude is suitably selected, a glow discharge will be ignited between rod 27 and the inner surface 16 of object 15. While this glow discharge is maintained, surface 16 and a layer of material just beneath it undergo certain changes in their structure, and particles of the surrounding atmosphere, or components of such particles, will be incorporated into the object within the said region. In this way, carbonization, nitrogenization or other treatment may be accomplished. Two examples will now be given, with numerical values that were found suitable:

*Example I*

For carbonizing the surface of a body of steel, the vessel is filled with methane at a pressure of about 10 millimeters of mercury. The discharge current is then so adjusted as to give a current density of .005 ampere per square centimeter (referring to the surface to be treated) which current density, according to experience, corresponds to a voltage of about 800 volts between cathode and anode. An average treatment yielding a satisfactory product will require about 1 hour.

*Example II*

For nitrogenizing the surface of a body of steel, the vessel is filled with ammonia at a pressure of about 6 millimeters of mercury. The discharge current is then so adjusted as to give a current density of .002 ampere per square centimeter, referring to the surface to be treated, which current density, according to experience, corresponds to a voltage of about 600 volts between cathode and anode. An average treatment yielding a satisfactory product will require about 5 hours.

Although the vessel shown in Fig. 1 is equipped for carrying out surface treatments, it will be obvious that the same type of vessel may be used for example in cases where the glow discharge serves the purpose of influencing, initiating or effecting chemical reactions between components of the gas filling.

A major difficulty in operation arises from the fact that the glow discharge shows a strong tendency to break down to an arc discharge. It is the purpose of the circuit shown in Fig. 3, now to be described, to eliminate the damaging effect such breakdowns may have.

Figure 3:
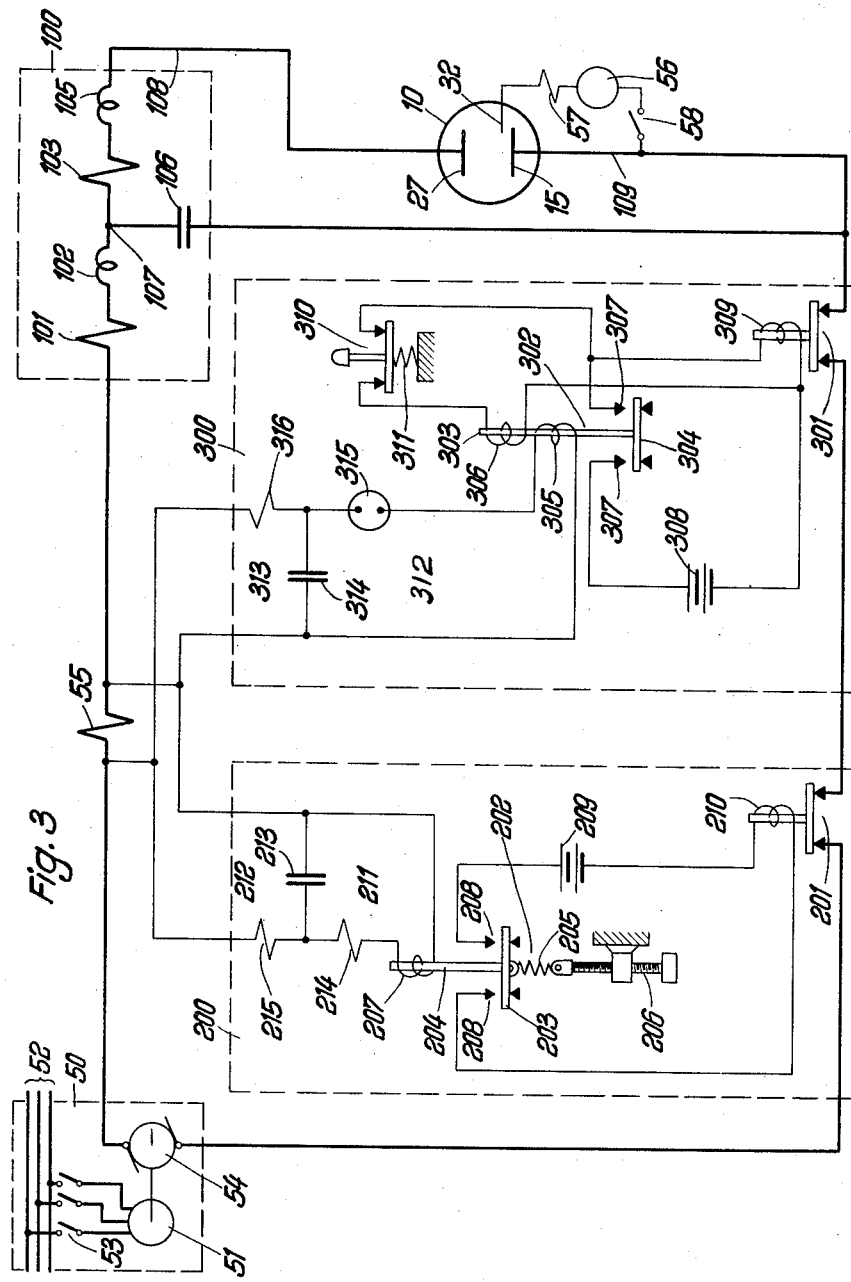
Fig. 3 is a circuit diagram.

In Fig. 3 I have shown for greater clarity, and in dotted lines, three individual blocks designated 100, 200, and 300, each block containing the major elements of a device for extinguishing an arc discharge, the devices contained in blocks 100 and 200 also being capable of automatically re-igniting the glow discharge. For brevity, the devices 100, 200, and 300 will hereafter be referred to as "extinguishers." The elements enclosed in block 100 are designated by numerals 101, 102, etc.; those enclosed in block 200 by numerals 201, 202, etc.; and those contained in block 300 by numerals 301, 302, etc. Also, circuit elements not participating directly in the action of the extinguishers 100, 200 and 300 are designated by two-digit numerals.

Referring now to the details shown in Fig. 3, the discharge vessel 10, its anode 27, cathode 15 and auxiliary electrode 32 are shown in the simplified manner customary in wiring diagrams. A source of electric energy, generally designated 50, comprises a rotary type of converter consisting of a 3-phase motor 51, connected to powerlines 52 through a master switch 53, and a D.-C. generator 54 in mechanical driving connection with the motor 51. Although I have shown a rotary type of converter as a means to convert the commercially available A.-C. power into D.-C. power, I sometimes prefer to use a transformer in combination with a 6-phase rectifier instead.

Connected in series with generator 54 are the discharge vessel 10, a resistor 55, a resistor 101, an inductance 102, a resistor 103, an inductance 105, a breaker 201, and a breaker 301. The resistors 101, 103 and the inductances 102 and 105 form part of a device generally designated 100. Similarly, breakers 201 and 301 are elements of two further devices generally designated 200 and 300. The devices 100, 200, and 300, to be described below, all serve the purpose of automatically extinguishing an arc discharge inside the vessel whenever the glow discharge has broken down to that undesirable form of gas discharge. Devices 100 and 200 serve the additional purpose to re-establish the glow discharge automatically after the arc has been extinguished. For brevity, all three devices will hereafter be referred to as "extinguishers."

Means are provided in the circuit to facilitate ignition of the glow discharge, not only when operation is started, but also whenever re-ignition is initiated by one of the extinguishers 100 and 200. These means comprise a source of electric energy 56 connected in series with a resistor 57 and the auxiliary electrode 32, the free terminal of source 56 being connected to the cathode 15. Source 56 may supply either D.-C. or medium frequency A.-C. Its voltage is so selected that a glow discharge will permanently be maintained between the cathode 15 and the auxiliary electrode 32. This discharge, however, is of low energy, the resistance of resistor 57 being sufficiently high to prevent this particular discharge from breaking down to an arc. A switch 58 may be provided, which switch is opened when the system is not to operate.

Although the voltages and currents involved in the operation of systems of the type under consideration here may vary considerably depending upon the type and size of the discharge vessel and the kind of treatment or process carried out in the vessel, one numerical example will be given here to facilitate an understanding of the operation.

In a typical case, the generator may supply 600 volts of D.-C. at its terminals which voltage, due to the voltage drop in resistors 55, 101 and 105 results in a voltage across the vessel of about 550 volts at a discharge current of 100 amperes and a total external resistance of .5 ohm. If the discharge breaks down to an arc, the voltage across the vessel breaks down to about 50 volts, with the current increasing correspondingly. Each such breakdown requires immediate action from one of the extinguishers 100, 200, and 300, in order to prevent the arc from doing damage and to re-establish the glow discharge, as will be described in detail below. As to the auxiliary source 56, a voltage supplied by it of about 1000 volts will usually be sufficient. At a voltage of this order of magnitude, resistor 57 should have a resistance in the order of magnitude of between 1000 and 10,000 ohms. The voltage value just mentioned applies for a D.-C. source as well as for a source generating medium frequency current. In the latter case, the order of magnitude of the frequency should be between $10^4$ and $10^8$ c.p.s., while frequencies in the orders of magnitude of $10^6$ and $10^7$ c.p.s. are preferred.

Turning now to the extinguisher generally designated 100 this type of extinguisher forms the subject of the co-pending applications for patent, Serial Nos. 515,426 and 634,232. A brief description will therefore suffice for the purpose of the present specification.

In addition to elements 101, 102, 103, and 104, extinguisher 100 comprises a capacitor 106 connected to the cathode 15 and anode 107 located between inductance 102 and resistor 103. The capacitance (in farads) of capacitor 106 and the total resistance of both resistors 55 and 101 (in ohms) should be so selected that their product is in the order of magnitude of $10^{-4}$ seconds.

Inductance 105 is to be understood to include the inductance inherent in the leads 108 and 109, connecting the electrodes 27 and 15 of the vessel to the remaining part of the system, which leads for structural reasons usually have a length of between 10 and 30 feet. If the inductance inherent in these leads is in the order of magnitude of 10 microhenrys, no additional inductance need be provided in the form of a coil, 10 microhenrys being a sufficient amount for satisfactory operation, at least in a system operated at relatively high current, as in the example given above. The same applies to resistor 103, which is to represent the resistance inherent in leads 108 and 109. In the typical case mentioned above, the resistance of resistor 103 may be in the order of magnitude reaches its negative peak and from then on tends to inance and may be disregarded here.

Operation of extinguisher 100 will be best understood from the plot shown in Fig. 4 where the voltage $v$ across the vessel, i.e. the voltage between electrodes 15 and 27, is plotted vs. the time $t$.

At normal operation, prior to a breakdown of the glow discharge to an arc discharge, voltage $v$ equals the discharge voltage $v_d$ of the glow discharge, say 550 volts, with capacitor 106 being charged to very nearly that same voltage. This situation is illustrated in Fig. 4 to the left of time $t_0$. Let now a breakdown occur at $t_0$, causing $v$ to drop almost abruptly to $v_a$, designating the discharge voltage of an arc discharge and usually being in the order of magnitude of 50 volts. It will be noted that the circuit loop comprising capacitor 106, resistor 103, inductance 105 and the vessel 10, with capacitance and inductance being present, is oscillatory, the damping being less than critical because the resistance in the loop is relatively small. The sudden change in current and in the voltage across the vessel 10 initiates an oscillation, causing the voltage across capacitor 106 to decrease rapidly, while the voltage across the vessel displays little change in magnitude. When the first half period of the oscillation is completed at $t_1$ the voltage across the capacitor reaches its negative peak and from then on tends to increase, while at the same instant the current attempts to reverse its direction. This reversal, however, is not possible because the arc discharge is extinguished at the moment the current passes through zero. Hence, the circuit is broken inside the vessel, the electrodes now assuming the potentials existing at the plates of the capacitor with the voltage across the vessel dropping to a negative value, as shown in Fig. 4. During the subsequent transient the voltage across the vessel increases gradually and, at $t_3$, reaches the ignition voltage $v_i$ of the glow discharge. When the glow discharge fires at $t_3$, the voltage again drops to $v_d$, conditions now being the same as prior to $t_0$.

For economical reasons the tendency will be to make the time interval $t_3-t_0$ as short as possible. This time interval consists of the extinction time $t_1-t_0$ and the ignition time $t_3-t_1$, both having been defined above. The de-ionization of the discharge space takes place during the ignition time $t_3-t_1$, and the probability that the discharge when re-ignited takes the form of an arc discharge will be the greater the shorter this latter time interval is selected. Hence, the economical requirement to make the ignition time short is in conflict with the requirement to avoid re-ignition of an arc discharge. It might be mentioned here that practical experience shows that the tendency of the discharge to re-appear in the form of an arc is not only a function of the length of the interval $t_3-t_1$, but that it also depends to a certain extent upon the slope of the $v$-curve during that interval.

It is of course possible to make the ignition time $t_3-t_1$ long enough to avoid re-ignition in the form of an arc under all practical conditions, just by making the time constant of the circuit loop comprising resistor 101 and capacitor 106 considerably greater than the longest de-ionization time experienced. This, however, would be an unsatisfactory solution to the problem. Therefore, in the system according to the invention, the ignition time, or time interval equalling $t_3-t_1$, is so dimensioned that there is a certain probability of an arc discharge re-appearing at re-ignition, a probability which, for example, may equal 1:5 or 1:10, so that in the average the glow discharge is not re-instated by the action of extinguisher 100 upon every fifth or tenth breakdown.

In a case where the discharge upon re-ignition once more takes the form of an arc discharge, the arc will be ignited mostly before voltage $v$ reaches the value $v_i$. For example, an arc may be ignited at time $t_2$ in Fig. 4 in a point P on the plot. Voltage $v$ will then once more drop to value $v_a$ and the process just described will repeat itself at reduced voltages, the reduction resulting from the fact that the step from P to $v_a$ is mostly less than the step from $v_d$ to $v_a$. If such new attempt of extinguisher 100 to eliminate the arc and re-establish the glow discharge is again unsuccessful, the process will be repeated once more and as many times as is necessary to reach success. Sometimes, however, extinguisher 100 might fail entirely, especially if the voltage corresponding to P is relatively low. In such a case the amplitude of the oscillation would be too small to effect the removal of the arc discharge, which discharge would then burn for an indefinite period of time, if no further means would be provided in the circuit to avoid such an undesirable situation.

It is the purpose of extinguisher 200 to extinguish the arc and re-establish the glow discharge if extinguisher 100 has failed to do so. Extinguisher 200, shown in some detail in Fig. 3, comprises an electromechanical relay of relatively high sensitivity, generally designated 202 and shown diagrammatically in the manner customary in circuit diagrams. The mechanical system of relay 202 carries the usual contact plate 203 and an iron core 204, and it is loaded by a spring 205 having a certain amount of preload, the preload being adjustable by means of a set screw 206. The iron core 204 is disposed in a coil 207 which, when energized, acts against spring 205 and tends to bring plate 203 in contact with two fixed contact points 208.

Electrically, points 208 are connected in series with a source 209 and the coil 210 of breaker 201, this latter coil when energized actuating the breaker and thereby breaking the discharge current.

The circuit containing coil 207 is a two-loop network 211, 212, the common element of loops 211 and 212 being a capacitor 213. Loop 211, in addition to capacitor 213 and coil 207, contains a resistor 214, while loop 212, in addition to capacitor 213, contains a resistor 215 and the resistor 55.

Resistors 214, 215 and 55 are so dimensioned and spring 205 is so adjusted that under steady-state conditions, with a glow discharge being present in vessel 10, the current in coil 207 is incapable of overcoming the spring force and closing contacts 208, while, on the other hand, the magnetic force of coil 207 will be stronger than the force of spring 205 whenever the current in coil 207 under steady-state conditions corresponds to the considerably higher amount of current flowing in resistor 55 while an arc discharge is present in the discharge vessel 10, contact plate 203 then closing the circuit containing coil 210 and source 209.

Due to the delaying action of the network 211, 212 the sudden change in the current in resistor 55 resulting from a breakdown of the glow discharge to an arc discharge will not result in an abrupt change in the current in coil 207, energizing relay 202. It is well-known to those familiar with elementary network theory that in a simple network of the type under discussion a sudden change in the voltage across resistor 55 results in a gradual change in the current glowing in coil 207, the delay depending upon the magnitudes of the capacitance of capacitor 213 and the resistance of resistors 214 and 215. Consequently, by suitably dimensioning these latter circuit elements, the closing of contacts 208 by contact plate 203 may be delayed within certain limits to any extent desired. Consequently, if the glow discharge breaks down to an arc discharge, the circuit comprising coil 210 of breaker 201 will not be closed until after some time has elapsed. Similarly, the circuit will not be re-opened immediately after the current in resistor 55 has dropped to zero due to the action of breaker 201.

Now, in the system according to the invention, by suitably dimensioning the circuit elements the delay in the breaking action of breaker 201 is so selected that breaker 201 will not break the discharge current before extinguisher 100 has failed to re-establish the glow discharge. No more is necessary for this purpose than to let the breaker act at a time $t_4$, with $t_4$ lying to the right of $t_3$ in the diagram shown in Fig. 4. In the above definition, the time interval $t_4-t_0$ is the extinction time of extinguisher 200, this interval exceeding the total operation time $t_3-t_0$ of extinguisher 100, as will be clear from Fig. 4. For example, in the most unfavorable case of extinguisher 100 failing completely to extinguish the arc, voltage $v$ will drop from $v_d$ to $v_a$ at $t_0$ and then stay at value $v_a$ for a time extending beyond $t_3$, as is shown in Fig. 4 in broken lines. With $t_4-t_0$ being the time required for breaker 201 to become active, the main circuit carrying the discharge current will be broken at $t_4$. Voltage $v$ across the vessel will then drop to zero and remain equal to zero until the delaying action of the network 211, 212 allows re-closing of the main circuit at $t_5$.

The time interval $t_5-t_4$ may easily be dimensioned so that it is considerably greater than the longest de-ionization time experienced in the vessel under the particular discharge conditions in a given case. The discharge space will then be de-ionized prior to time $t_5$ and the re-closing of the main circuit by breaker 201 will not result in an arc discharge re-appearing in the vessel.

When breaker 201 closes the main circuit at $t_5$ the delaying effect of capacitor 106 and the resistors in the main circuit will cause the voltage $v$ across the vessel 10 to increase gradually, as shown in Fig. 4. It might be mentioned that the transient originating at $t_5$ is of some importance because it was found that the danger of an arc discharge being re-ignited between the electrodes is considerably less if the voltage $v$ is not allowed to jump abruptly from zero to the ignition value $v_i$ and that, consequently, the time interval $t_5-t_4$ (which is the ignition time of extinguisher 200) may be made shorter than in a circuit where no transient is initiated at $t_5$.

Fig. 4 should not be evaluated quantitatively. The presentation is to be understood purely qualitative, and the following should be noted in this respect:

The extinction time $t_4-t_0$ of extinguisher 200 is greater than the total operation time $t_3-t_0$ of extinguisher 100, so that extinguisher 100 will have at least one opportunity to accomplish extinction and re-ignition without extinguisher 200 getting into action. The interval $t_4-t_0$ may, however, be made considerably greater than the interval $t_3-t_0$, in which case extinguisher 100 may perform several attempts to extinguish the arc and re-establish the glow discharge, extinguisher 200 becoming active only if extinguisher 100 has failed in all of these attempts.

For the reasons stated above, the ignition time $t_3-t_1$ of extinguisher 100 is less than the longest de-ionization time to be expected, which is of advantage from an economical point of view, but also results in an eventual failure of extinguisher 100. The ignition time $t_5-t_4$ of extinguisher 200, however, is made long enough to allow de-ionization of the discharge space even under the most unfavorable conditions. The difference between the ignition times $t_5-t_4$ and $t_3-t_1$ is not shown to scale in Fig. 4. Actually, the ignition time of extinguisher 200 is preferably made at least one order of magnitude and preferably two orders of magnitude greater than the ignition time of extinguisher 100.

The extinction time $t_4-t_0$ of extinguisher 200 may be in the same order of magnitude as its ignition time $t_5-t_4$. An arc which could not be handled satisfactorily by extinguisher 100 is then allowed to burn for a relatively long time. This will often be found to be of advantage because some solid impurity on the electrode surface which had caused a breakdown at $t_0$ is then removed by the very action of the arc.

A plot drawn to scale and showing how voltage $v$ changes in an actual case would not be illustrative because of the considerable differences between the various time intervals involved. A few numerical values will therefore be given, in order to give a better idea of how a system according to the invention will operate.

As mentioned above, the product of the capacitance of capacitor 106 and the sum of the resistances of resistors 55 and 101 is preferably in the order of magnitude of $10^{-4}$ seconds. The ignition time $t_3-t_1$ of extinguisher 100 will then be of the same order of magnitude. The extinction time $t_1-t_0$ will mostly be less than the ignition time and may, for example, equal about $10^{-5}$ seconds.

The ignition time $t_5-t_4$ of extinguisher 200 is preferably in the order of magnitude of between $10^{-2}$ and $10^{-3}$ seconds. This time depends upon the time constant of the network 211, 212 and, to a certain extent upon the dynamic properties and mechanical adjustments of relay 202. Satisfactory results will be obtained if, for example, capacitor 213 has a capacitance of 10 microfarads and resistors 214 and 215 each have a resistance of 1000 ohms. The simple two-loop network 211 and 212 shown in Fig. 3 has only one time constant and in itself would not yield any substantial difference between the extinction time and ignition time of extinguisher 200. However, such a difference, if desired, may be obtained from relay 202, most common-type relays having different sensitivities when making and breaking the circuit controlled by them. Of course, the rather simple network 211, 212 may be replaced by a more complex type of network including non-linear elements such as rectifiers, in order to obtain different time constants.

For simplicity, I have shown in Fig. 3 a mechanical type of relay as one of the vital elements of extinguisher 200, although I mostly prefer to make use of an electronic type of relay instead, the electronic type being less expensive than a fast operating electromechanical relay of high sensitivity. For the same reasons, a mechanical type of breaker was selected for the presentation in Fig. 3, although it will often be found of advantage to use an electronically operating device instead. For example, a grid-control rectifier could be used to convert commercially available A.-C. power into D.-C. power instead of the rotary type of converter shown in Fig. 3, and the potentials of the rectifier grids could then be controlled by extinguisher 200 in order to open and close the main circuit. Grid-controlled rectifiers and related circuits are well-known to those skilled in the art and thus need not be shown here in detail.

A system comprising the elements described so far is fully operative and will give excellent results in operation. In other words, two extinguishers having the basic properties of extinguishers 100 and 200 described above will be sufficient to eliminate all adverse effects resulting from breakdowns of the glow discharge to an arc discharge, and they will at the same time yield high efficiency and economy. However, once in a while and under exceptionally unfavorable conditions, mostly resulting from some irregularity existing inside the discharge vessel, the glow discharge may happen to break down to an arc discharge which is so obstinate that even a complete de-ionization of the discharge space by interrupting the discharge current for as long a time as $10^{-3}$ or $10^{-2}$ seconds does not prevent the arc from re-appearing upon re-ignition. At such an occurrence, a vigilant operator watching the process may be expected to shut off the power at once. However, just because such occurrences are unfrequent and may not happen even once in say ten processes, with each process taking several hours, there will be a high probability that the vigilance of the operator relaxes and the occurrence happens unnoticed, with considerable damage resulting. It is for these reasons that I prefer to provide in the system a third extinguisher 300, which extinguisher is to interrupt the main circuit after extinguishers 100 and 200 both have failed to extinguish the arc.

Extinguisher 300, shown schematically in Fig. 3, is somewhat similar to extinguisher 200; it does not, however, provide for automatic re-closing of the main circuit. One of the vital elements of extinguisher 300 is a relay of rather high sensitivity, generally designated 302. For simplicity, an electromechanical type of relay was chosen for the presentation in Fig. 3. The relay shown comprises an iron core 303 carrying a contact plate 304 extending into a pair of solenoids 305 and 306. Current in any one or both of the solenoids 305 and 306 will lift the contact plate 304 into a position in which it gets in contact with two fixed contact points 307. Electrically, contact points 307 are connected in series with a source 308 and the coil 309 of breaker 301. Coil 309 is connected in parallel with solenoid 306, a manually operable switch 310 being provided in one of the leads connecting solenoid 306 to coil 309. Switch 310 is normally closed and may be open by overcoming the force of a spring 311. It will be clear from the foregoing that solenoid 305 when energized will cause the contact plate 304 to close the circuit containing source 308 and coil 309, simultaneously energizing solenoid 306, the latter then holding plate 304 in its lifted position even after solenoid 305 has been de-energized, until switch 310 is operated. Closing the circuit containing coil 309 will cause breaker 301 to disconnect the discharge vessel 10 from its source 50, and operation will not be resumed until switch 310 has been actuated manually.

Solenoid 305 forms part of a two-loop network 312, 313, loops 312 and 313 having a capacitor 314 as their common element. Loop 312 also contains a glow discharge tube 315 of the low-current type, while loop 313, in addition to capacitor 314, contains a resistor 316 and the resistor 55, the latter forming part of the main circuit and carrying the discharge current in vessel 10.

Resistor 55 and the glow discharge tube 315 are so dimensioned that the voltage across resistor 55 is less than the ignition voltage of tube 315 as long as the current in resistor 55 equals the discharge current of a glow discharge in vessel 10, the current in solenoid 305 then equalling zero. If the glow discharge breaks down to an arc discharge, the voltage across resistor 55, due to the considerable increase in current resulting from the breakdown, will assume a value exceeding the ignition voltage of the glow discharge tube 315. However, due to the delaying action of capacitor 314 in combination with resistor 316, the voltage across the tube 315 will build up gradually, and it will reach the ignition value of the tube not before some time has elapsed after the breakdown has happened. When the ignition voltage of tube 315 is reached, the tube fires and thereby closes loop 312, the current now flowing in solenoid 306 actuating relay 302 and thereby causing breaker 301 to disconnect the discharge vessel 10 from source 50.

The time elapsing between a breakdown and the firing of the glow discharge tube 315 is in the order of magnitude of the time constant of loop 313 plus the response time of relay 302. The said time constant equals the product of the resistance of resistor 316 and the capacitance of capacitor 314. If this capacitance and resistance are so selected that their product exceeds the total operation time $t_5 - t_0$ of extinguisher 200, extinguisher 300 will not become active except in a case in which an obstinate arc discharge cannot be extinguished permanently by the action of extinguisher 200, as may happen under exceptional conditions. For example, if the extinction time and ignition time of extinguishers 100 and 200 have been dimensioned as described above, an extinction time of extinguisher 300 in the order of magnitude between $10^{-1}$ and 1 second will be in agreement with what has just been stated. Numerically, if for example the resistance of resistor 316 equals about $10^4$ ohms and the capacitance of capacitor 314 lies between 10 and 100 microfarads, the time elapsing between a breakdown to an arc discharge and the opening of the main circuit by breaker 301 would lie between $10^{-1}$ and 1 second, provided that normal operation had not been re-established before by the action of extinguisher 100 or extinguisher 200.

In the unfrequent case that operation has been discontinued by breaker 301 opening the main circuit, the operator will investigate what irregularity inside the vessel had caused an obstinate arc discharge to burn between the electrodes. The operator may resume operation by actuating switch 310 after the irregularity has been eliminated.

The electromechanical type of relay 310 shown in Fig. 3 may of course be replaced by an electronic type of relay or automatic switch. Considering, however, that the response time of extingusher 300 is comparatively long and that extinguisher 300 is primarily a safety device, electromechanical relays and breakers will mostly be preferable.

What I claim is:

1. In a system for operating a glow discharge at a discharge current exceeding the order of magnitude of one ampere, in combination, a discharge vessel, means to evacuate said vessel, at least two electrodes inside said vessel, a source of electric energy, an electric circuit connecting said source and said electrodes for supplying to said electrodes a voltage and a current sufficient for operating said glow discharge, first means in said circuit for automatically extinguishing an arc discharge that results from a breakdown of said glow discharge and thereupon re-igniting said glow discharge, second means in said circuit for automatically extinguishing an arc discharge that results from a breakdown of said glow discharge and thereupon re-igniting said glow discharge, means for delaying the extinction of said arc discharge by said second means by a period of time exceeding the time said first means require to extinguish said arc discharge and to re-ignite said glow discharge, whereby an arc discharge resulting from a breakdown of said glow discharge is extinguished and a glow discharge re-established through the action of said second means whenever said first means have not succeeded in re-establishing said glow discharge.

2. In a system for operating a glow discharge at a discharge current exceeding the order of magnitude of one ampere, in combination, a discharge vessel, means to evacuate said vessel, at least two electrodes inside said vessel, a source of electric energy, an electric circuit connecting said source and said electrodes for supplying to said electrodes a voltage and a current sufficient for operating said glow discharge, first means in said circuit for automatically extinguishing an arc discharge that results from a breakdown of said glow discharge and thereupon re-igniting said glow discharge, second means in said circuit for automatically extinguishing an arc discharge that results from a breakdown of said glow discharge, means for delaying the extinction of said arc discharge by said second means by a period of time exceeding the time said first means require to extinguish said arc discharge and to re-ignite said glow discharge, by which an arc discharge resulting from a breakdown of said glow discharge is extinguished through the action of said second means whenever said first means have not succeeded in re-establishing said glow discharge.

3. In a system for operating a glow discharge at a discharge current exceeding the order of magnitude of one ampere, in combination, a discharge vessel, means to evacuate said vessel, at least two electrodes inside said vessel, a source of electric energy, an electric circuit connecting said source and said electrodes to supply to said electrodes a voltage and a current sufficient for operating said glow discharge, first means in said circuit for automatically extinguishing an arc discharge that results from a breakdown of said glow discharge and thereupon re-igniting said glow discharge, second means in said circuit for automatically extinguishing an arc discharge that results from a breakdown of said glow discharge and thereupon re-igniting said glow discharge, means for delaying the extinction of said arc discharge effected by said second means by a period of time exceeding the time said first means require to extinguish said arc discharge and to re-ignite said glow discharge, means for delaying the re-igniting of said glow discharge by said second means after the extinguishing of said arc discharge by said second means by a period of time substantially longer than the period of time said first means require for re-igniting said glow discharge after having extinguished said arc discharge, whereby an arc discharge resulting from a breakdown of said glow discharge is extinguished and a glow discharge re-established through the action of said second means whenever said first means have not succeeded in re-establishing said glow discharge.

4. In a system for operating a glow discharge at a discharge current exceeding the order of magnitude of one ampere, in combination, a discharge vessel, means to evacuate said vessel, at least two electrodes inside said vessel, a source of electric energy, an electric circuit connecting said source and said electrodes for supplying to said electrodes a voltage and a current sufficient for operating said glow discharge, first means in said circuit for automatically extinguishing an arc discharge that results from a breakdown of said glow discharge and thereupon re-igniting said glow discharge, second means in said circuit for automatically extinguishing an arc discharge that results from a breakdown of said glow discharge and thereupon re-igniting said glow discharge, means for delaying the extinction of said arc discharge by said second means by a period of time exceeding the time said first means require to extinguish said arc discharge and to re-ignite said glow discharge, means for delaying the re-igniting of said glow discharge by said second means after the extinguishing of said arc discharge by said second means by a period of time being at least one order of magnitude longer than the period of time said first means require for re-igniting said glow discharge after having extinguished said arc discharge, whereby an arc discharge resulting from a breakdown of said glow discharge is extinguished and a glow discharge re-established through the action of said second means whenever said first means have not succeeded in re-establishing said glow discharge.

5. In a system for operating a glow discharge at a discharge current exceeding the order of magnitude of one ampere, in combination, a discharge vessel, means to evacuate said vessel, at least two electrodes inside said vessel, a source of electric energy, an electric circuit connecting said source and said electrodes for supplying to said electrodes a voltage and a current sufficient for operating said glow discharge, first means in said circuit for automatically extinguishing an arc discharge that results from a breakdown of said glow discharge and thereupon re-igniting said glow discharge, second means in said circuit for automatically extinguishing an arc discharge that results from a breakdown of said glow discharge and thereupon re-igniting said glow discharge, means for delaying the extinction of said arc discharge by said second means by a period of time exceeding the time said first means require to extinguish said arc discharge and to re-ignite said glow discharge, third means in said circuit for automatically extinguishing an arc discharge resulting from a breakdown of said glow discharge, means for delaying the extinction of said arc discharge by said third means by a period of time exceeding the time said second means require to extinguish said arc discharge and to re-ignite said glow discharge, whereby an arc discharge resulting from a breakdown of said glow discharge is extinguished through the action of said third means whenever said second means have not succeeded in re-establishing said glow discharge.

6. In a system as claimed in claim 5, said third means comprising an automatic breaker in series with said discharge vessel, said breaker being sensitive to the change in electrical conditions in said circuit resulting from a breakdown of said glow discharge to an arc discharge.

7. In a system as claimed in claim 1, said source of electric energy adapted to supply direct current energy and said first means comprising a resistor connected in series with said source and further comprising an inductance connected in series with said electrodes, a capacitor being connected in parallel with said series connections of said resistor with said source and said inductance with said electrodes.

8. In a system for operating a glow discharge at a discharge current exceeding the order of magnitude of one ampere, in combination, a discharge vessel, means to evacuate said vessel, at least two electrodes inside said vessel, a source of electric energy, an electric circuit connecting said source and said electrodes for supplying to said electrodes a voltage and a current sufficient for operating said glow discharge, first means in said circuit for automatically extinguishing an arc discharge that results from a breakdown of said glow discharge and thereupon re-igniting said glow discharge, said first means requiring from the extinguishing of said arc discharge to the re-igniting of said glow discharge a period of time not exceeding the order of magnitude of $10^{-4}$ seconds, second means in said circuit for automatically extinguishing an arc discharge that results from a breakdown of said glow discharge and thereupon re-igniting said glow discharge, said second means requiring from the extinguishing of said arc discharge to the re-igniting of said glow discharge a period of time not less than $10^{-3}$ seconds, means for delaying the extinction of said arc discharge by said second means by a period of time exceeding the time said first means require to extinguish said arc discharge and to re-ignite said glow discharge, whereby an arc discharge resulting from a breakdown of said glow discharge is extinguished and a glow discharge re-established through the action of said second means whenever said first means have not succeeded in re-establishing said glow discharge.

9. In a system as claimed in claim 8, said second means requiring from the breakdown of said glow discharge to the extinction of said arc discharge a period of time at least one order of magnitude longer than the period of time said first means require from the breakdown of said glow discharge to the extinction of said arc discharge.

10. In a system for operating a glow discharge at a discharge current exceeding the order of magnitude of one ampere, in combination, a discharge vessel, means to evacuate said vessel, at least two electrodes inside said vessel, a source of electric energy, an electric circuit connecting said source and said electrodes, said circuit being adapted to supply to said electrodes a voltage and a current sufficient for operating said glow discharge, first means in said circuit for automatically extinguishing an arc discharge that results from a breakdown of said glow discharge and thereupon re-igniting said glow discharge, second means in said circuit for automatically extinguishing an arc discharge that results from a breakdown of said glow discharge and thereupon re-igniting said glow discharge, means for delaying the extinction of said arc discharge by said second means by a period of time exceeding the time said first means require to extinguish said arc discharge and to re-ignite said glow discharge, a third electrode inside the vessel and connected to one terminal of a second source of electric energy, the second terminal of said second source being connected to one of said two electrodes, whereby said second source and third electrode enable a low-power glow discharge to be maintained inside the vessel between said third electrode and one of said two electrodes.

References Cited in the file of this patent

UNITED STATES PATENTS 2,227,829    Hansell  ---------------- Jan. 7, 1941